(12) United States Patent
Reddy et al.

(10) Patent No.: US 11,741,061 B2
(45) Date of Patent: Aug. 29, 2023

(54) METHODS AND SYSTEMS FOR PREVENTING CORRUPTION OF STATEFUL DATA

(71) Applicant: Capital One Services, LLC, McLean, VA (US)

(72) Inventors: Vishruth Reddy, McLean, VA (US); Venkata Chintala, McLean, VA (US); Brian Ryu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/232,466

(22) Filed: Apr. 16, 2021

(65) Prior Publication Data

US 2022/0335021 A1    Oct. 20, 2022

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC .......................... G06F 16/215; G06F 16/2365
See application file for complete search history.

(56) References Cited

U.S. PATENT DOCUMENTS

| | | | |
|---|---|---|---|
| 10,445,312 B1* | 10/2019 | Lewis | G06F 16/22 |
| 2003/0074252 A1* | 4/2003 | Chandler-Pepelnjak | G06Q 30/0255 705/14.53 |
| 2013/0024274 A1* | 1/2013 | Villars | G06Q 10/00 705/14.45 |
| 2015/0032533 A1* | 1/2015 | Raab | G06Q 30/0248 705/14.47 |

* cited by examiner

*Primary Examiner* — Taelor Kim
(74) *Attorney, Agent, or Firm* — Perkins Coie LLP (57) ABSTRACT

Methods and systems described herein recite the use of specific data structures for stateful data that include fields for populating with specific information that may be used to prevent and/or minimize the corruption in stateful data. The systems and methods may recite the application of specific data normalization sets that include functions to be applied to test data sets and control data sets, respectively, in order to prevent and/or minimize the corruption. Finally, the methods and systems may recite the determination of incrementality being based on uncorrupted impressions corresponding to test data sets and control data sets, respectively.

18 Claims, 6 Drawing Sheets

| Data Type | Function | Key Fields |
|---|---|---|
| Impressions | Used for data on every impression display served. | *Cookie ID, Placement Name, Record Date* — 502 |
| Applications (Conversions) | Used for data on all applications, filtered by cookies impressed by display. | *Cookie ID, Event Type, Record Date* — 504 |
| Identity Graph | Used to aggregate cookies to a household. | *Cookie ID, Household ID* — 506 |
| Functional Variables | Used to prevent corruption | *Cookie ID, Household ID, Geographic ID, Time Period ID, Group Mean, Impression Number, Group Threshold, Threshold Metric* — 508 |

METHODS AND SYSTEMS FOR PREVENTING CORRUPTION OF STATEFUL DATA

FIELD OF THE INVENTION

The invention relates to preventing corruption in stateful data.

BACKGROUND

In recent years, user engagement with content has moved to a multitude of platforms. For example, while television dominated as the main point of interaction of users with content for decades, Internet-based and/or mobile-based formats have now overtaken television. This transition has created new problems with detecting and monitoring these interactions. For example, mechanisms that rely solely on network television ratings to detect interactions are no longer viable.

SUMMARY

Methods and systems are described herein for determining incrementality of impressions corresponding to stateful data. In conventional systems, when a user interacts with content (e.g., by viewing, clicking, and/or storing content), the system (or application) may store stateful data (e.g., a cookie), which may contain information about the interaction or impression (e.g., when content renders on a screen of a user). Subsequently, when a user converts (e.g., performs an action after the impression), a conversion tracking tag installed on the system reads the stateful data and transmits the stateful data to the system with the conversion information. However, conventional uses of stateful data (e.g., via Internet cookies) to determine conversions based on impressions are susceptible to corruption when attempting to determine incrementality (e.g., a rate of conversion as impressions are increased) based on those impressions.

To overcome this corruption, the methods and systems described herein recite the use of specific data structures for stateful data that include fields for populating with specific information that may be used to prevent and/or minimize the corruption. Additionally or alternatively, the systems and methods recite the application of specific data normalization sets that include functions to be applied to test data sets and control data sets, respectively, in order to prevent and/or minimize the corruption. Finally, the methods and systems recite the determination of incrementality being based on uncorrupted impressions corresponding to test data sets and control data sets, respectively.

In some aspects, methods and systems for preventing corruption in stateful data used for determining incrementality of impressions corresponding to the stateful data are described. For example, the system may retrieve a test data set, wherein the test data set comprises respective stateful data for test content, and wherein the respective stateful data indicates impressions made corresponding to the test content. The system may retrieve a control data set, wherein the control data set comprises respective stateful data for control content, and wherein the respective stateful data indicates impressions made corresponding to the control content. The system may retrieve a data normalization function set, wherein the data normalization function set comprises a first function for removing corruption from the test data set and a second function for removing corruption from the control data set. The system may process the test data set using the first function to determine an uncorrupted test data set, wherein the uncorrupted test data set comprises uncorrupted respective stateful data for the test content, and wherein the uncorrupted respective stateful data indicates uncorrupted impressions made corresponding to the test content. The system may process the control data set using the control function to determine an uncorrupted control data set, wherein the uncorrupted control data set comprises uncorrupted respective stateful data for the control content, and wherein the uncorrupted respective stateful data indicates uncorrupted impressions made corresponding to the control content. The system may determine an incrementality based on the uncorrupted impressions made, which correspond to the test content, and uncorrupted impressions corresponding to the control content. The system may generate for display, on a user interface, a recommendation based on the incrementality.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to mobile applications.

Figure 1:
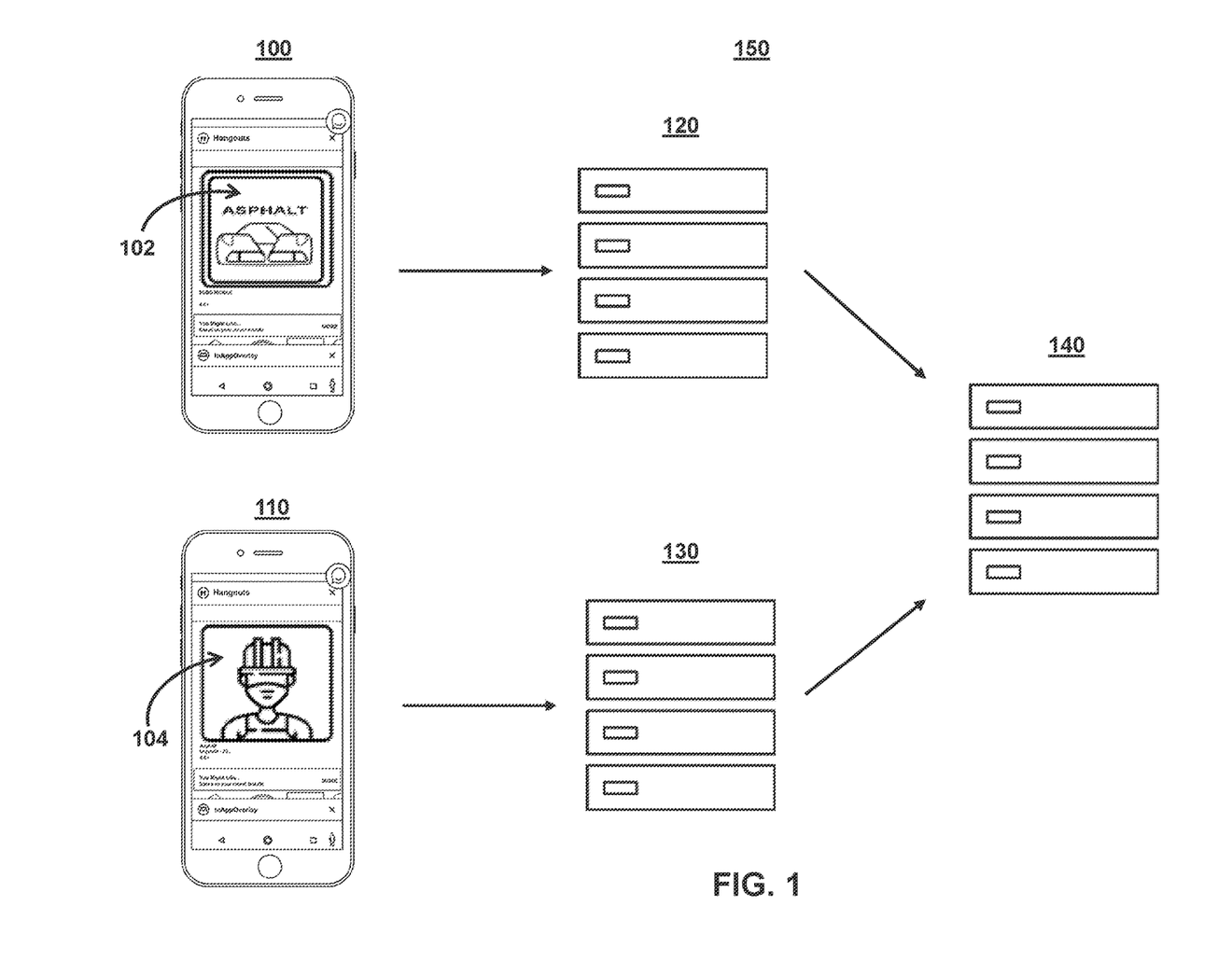
FIG. 1 shows an illustrative diagram for determining incrementality of impressions corresponding to stateful data, in accordance with one or more embodiments.

FIG. 1 shows an illustrative diagram for determining incrementality of impressions corresponding to stateful data, in accordance with one or more embodiments. For example, FIG. 1 includes system 150. System 150 may include user device 100 and user device 110. User device 100 is currently presenting content 102, and user device 110 is currently present content 104. As referred to herein, the "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

For example, FIG. 1 may represent display incrementality testing that is set up at a stateful data level (e.g., a cookie). For example, stateful data may be data that a computer or program stores to track a state of interaction or impression (e.g., by setting values in a storage field designated for that purpose). In some embodiments, the stateful data may comprise a stateful container. For example, the stateful data may use an API object to manage stateful applications. In some embodiments, the stateful data may be implemented in a stateless protocol (e.g., HTTP).

In some embodiments, content 102 and content 104 may be presented by a content provider with a goal of persuading a viewer to perform (or not perform) an action. For example, content 102 may comprise an advertisement for a product. A view of content 102 or content 104 may comprise an impression. An impression (in the context of online advertising) may be when an advertisement is fetched from its source and is countable. For example, system 150 may count each impression related to content 102 and content 104.

In some embodiments, system 150 may further use each impression related to content 102 and content 104 to determine whether or not a conversion based on an impression occurred. A conversion may include an action that is counted when a user interacts with content (e.g., clicks on content 102) and then takes an action that is previously defined (e.g., purchasing a product related to the content). For example, server 120 may operate a website that detects a conversion related to content 102, whereas server 130 may operate a website that detects a conversion related to content 104. For example, when a user interacts with content 102 (by clicking a text ad or viewing a video ad), user device 100 may store stateful data (e.g., cookies) that contain information about the impression. When a user later converts on a website (e.g., operated by server 120), the conversion tracking tag installed at user device 100 sends information back to server 140 with the conversion information.

System 150 may then determine a conversion rate and/or incrementality at server 140. For example, system 150 may record information about impressions and conversions to determine a conversion rate. For example, the conversion rate may be a number of conversions divided by the total number of impressions. For example, if content receives 200 impressions in a month and has 50 conversions, the conversion rate would be 50 divided by 200, or 25%. The system may determine a conversion rate for both test content and control content.

System 150 may further determine an incrementality related to content 102 and content 104. For example, incrementality may be a measure of the lift that advertising spent and provided to the conversion rate. To measure incrementality, system 150 may compare how many impressions are allocated to targets known users. To test incrementality, system 150 may include test content (e.g., content 102) and control content (e.g., content 104). Test content may include content that directs users to a conversion (e.g., an advertisement for a product), and control content may not include content that directs users to a conversion (e.g., content that is not an advertisement for a product). For example, system 150 may send ninety percent of users content 102 and ten percent of users content 104. System 150 may then determine a test application rate, which is based on whether a user that converted was served test content. System 150 may then determine a control application rate, which is based on whether a user that converted was served control content. System 150 may then determine incrementality as the result of test conversion rate divided by control conversion rate. For example, the system may determine incrementality as a difference between a test and control conversion rate, which is then divided by the test conversion rate.

Figure 2:
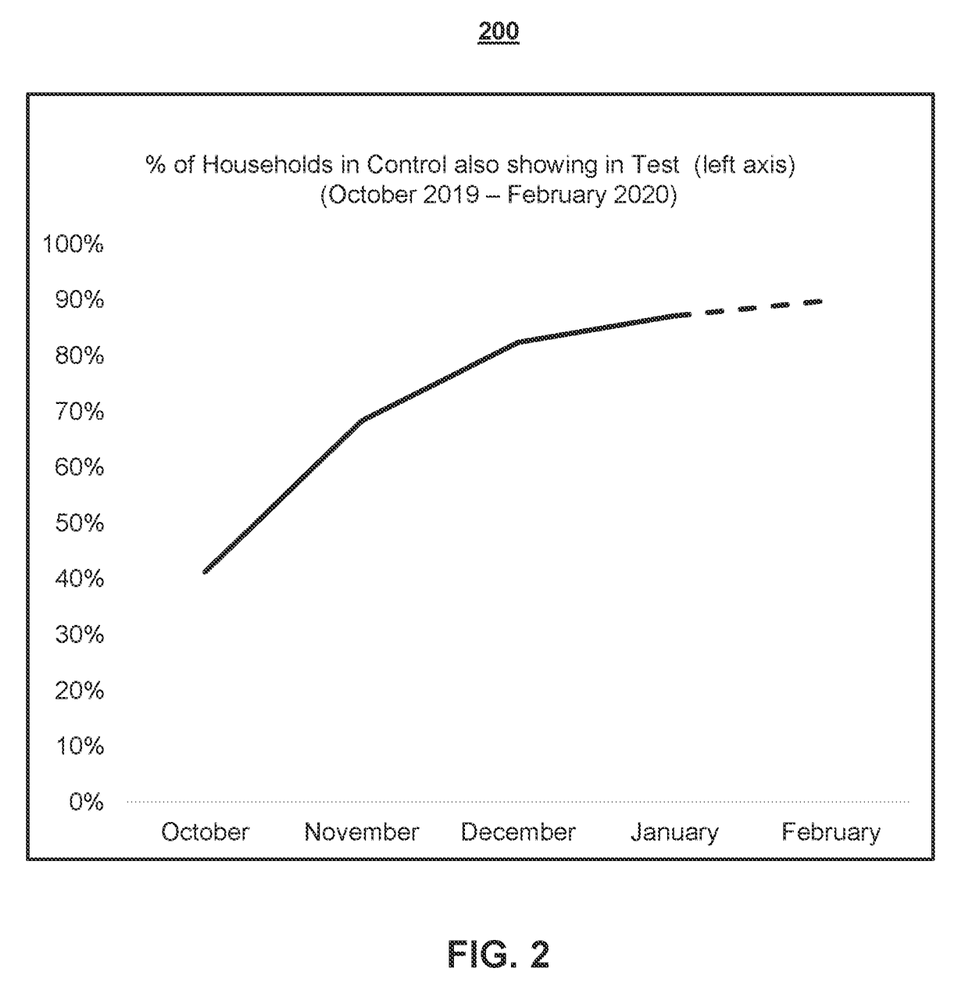
FIG. 2 shows an illustrative diagram of corruption introduced to impressions corresponding to the stateful data, in accordance with one or more embodiments.

However, as shown in FIG. 2, system 150 may have corruption issues under this approach. For example, FIG. 2 shows an illustrative diagram of corruption introduced to impressions corresponding to the stateful data, in accordance with one or more embodiments. For example, while a percentage of impressions are increasing, incrementality may decrease after a certain time period. The rationale is due to corruption. For example, after a certain time period, the amount of users that view both test and control content may increase as shown in chart 200. To overcome this corruption, the methods and systems described herein recite the use of specific data structures for stateful data that include fields for populating with specific information that may be used to prevent and/or minimize the corruption. Additionally or alternatively, the systems and methods recite the application of specific data normalization sets that include functions to be applied to test data sets and control data sets, respectively, in order to prevent and/or minimize the corruption. Finally, the methods and systems recite the determination of incrementality being based on uncorrupted impressions corresponding to test data sets and control data sets, respectively.

Figure 3:
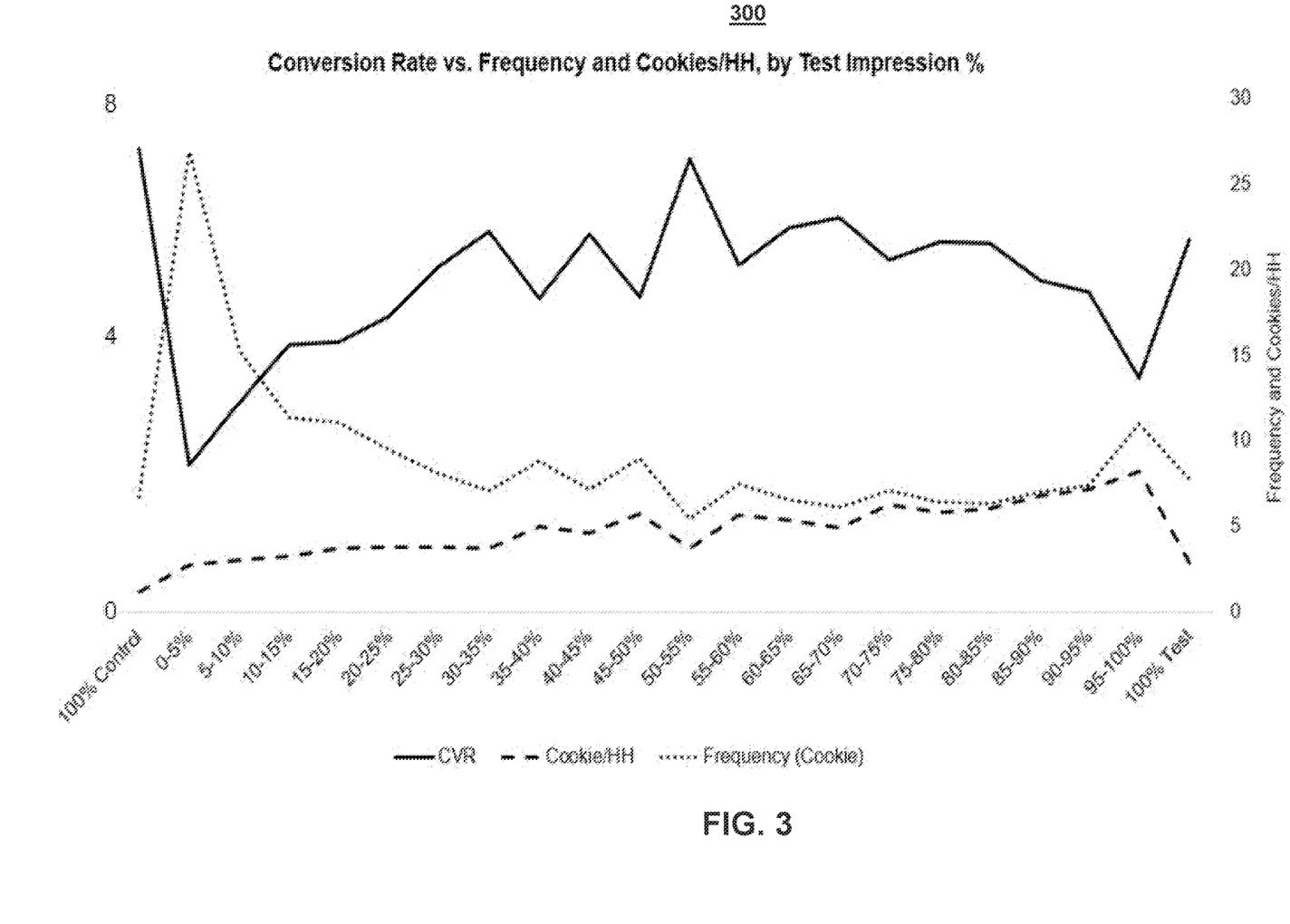
FIG. 3 shows an illustrative diagram of effects of corruption on determining incrementality of impressions corresponding to stateful data, in accordance with one or more embodiments.

FIG. 3 shows an illustrative diagram of effects of corruption on determining incrementality of impressions corresponding to stateful data, in accordance with one or more embodiments. As shown in diagram 300, conversion rate (e.g., "CVR") may have correlations with stateful data and impressions based on stateful data as well as a frequency of the stateful data and/or impressions.

Based on these correlations, the system may apply normalization function sets to prevent corruption. For example, the system may calculate incrementality that uses the Households (groups of users) with the most and least percentage of Test Impressions as proxies for Test and Control, respectively. For example, the system may use 0-30% Test Impressions can be defined as Control (e.g., included in a content data set), 70-100% Test Impressions can be defined as Test (e.g., included in a test data set). In another example, the system may calculate incrementality measurement by applying thresholds to data sets. For example, the system may apply a threshold to ensure that any test and/or control data is found with the 30-70% range for impressions. Alternatively or additionally, the system may determine an average, mean, and/or filter data based on a number of standard deviations from a mean and/or average of the data shown in FIG. 3. Additionally, the primary y-axis (e.g., corresponding to conversion rate and/or a number of conversions) may be scaled to an indexed scale conversion rate. For example, the scaled conversion rate may be on a scale of 0 to 8 as shown in FIG. 3. It should be noted that other metrics (e.g., percent conversion of total conversions and/or impressions) may be used. Additionally, a scaling factor for the conversion rate may be based on the number of impressions, the number of conversions, a type of content related to the conversion, a campaign characteristics, and/or industry standards.

Figure 4:
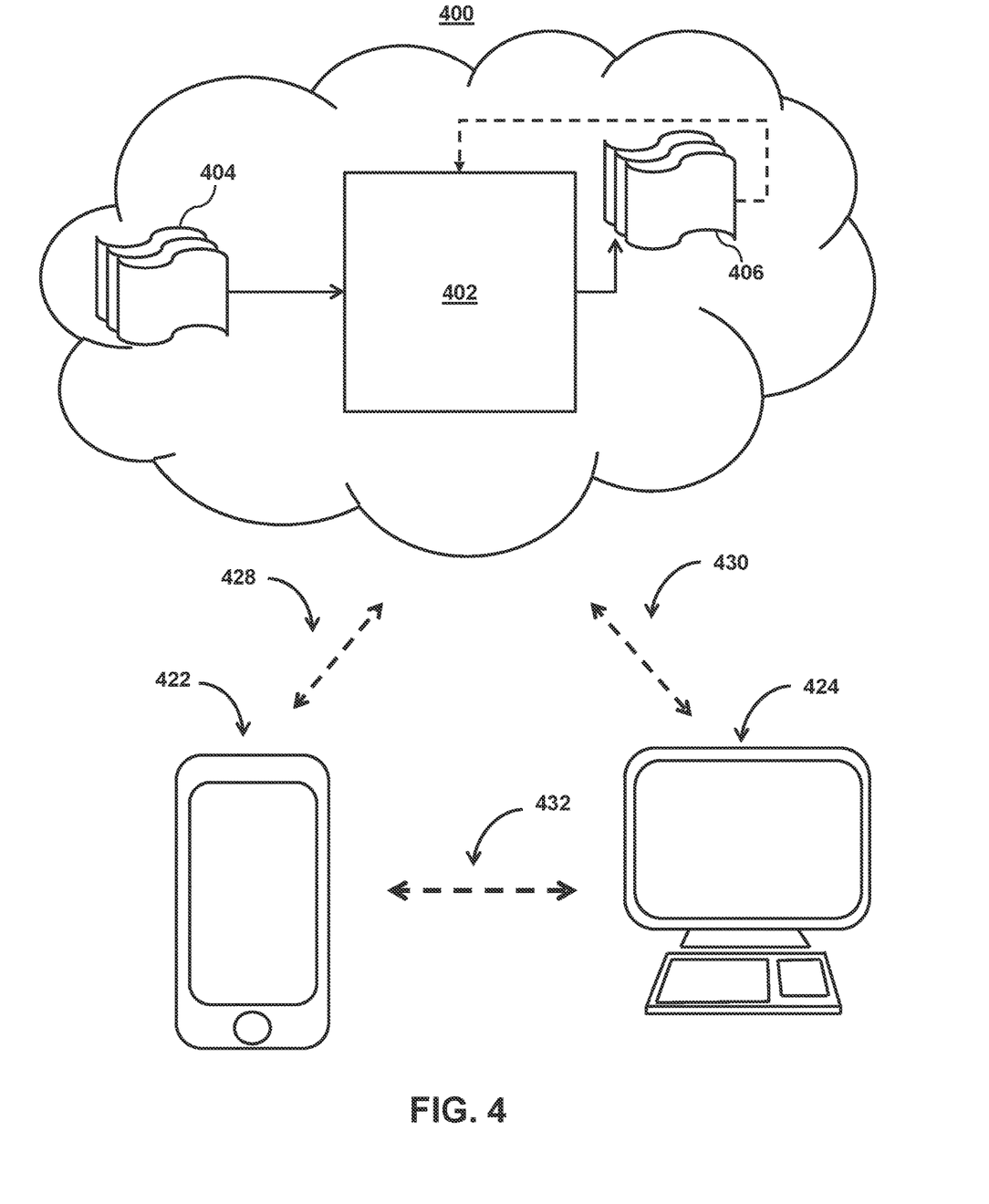
FIG. 4 shows an illustrative system for preventing corruption in stateful data used for determining incrementality of impressions corresponding to the stateful data, in accordance with one or more embodiments.

FIG. 4 shows an illustrative system for preventing corruption in stateful data used for determining incrementality of impressions corresponding to the stateful data, in accordance with one or more embodiments. As shown in FIG. 4, system 400 may include user device 422, user device 424, and/or other components. Each user device may include any type of mobile terminal, fixed terminal, or other device. For example, each of these devices may comprise one or more of the devices shown in FIG. 1. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user device 100 (FIG. 1)).

By way of example, user device 422 and user device 424 may include a desktop computer, a server, or other client device. Users may, for instance, utilize one or more of the user devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of user device 422, those operations may, in some embodiments, be performed by components of user device 424. System 400 also includes server 402, which may be implemented on user device 422 and user device 424, or accessible by communication paths 428 and 430, respectively. In some embodiments, server 402 may include a machine learning model. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communication networks or combinations of communication networks. Communication paths 428, 430, and 432 may include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 4, server 402 may take inputs 404 and provide outputs 406. The inputs may include multiple data sets such as a training data set and a test data set. In some embodiments, outputs 406 may be fed back to server 402 as input to train a machine learning model on server 402 (e.g., alone or in conjunction with user indications of the accuracy of outputs 406, labels associated with the inputs, or with other reference feedback information). In another embodiment, server 402 may update its configurations (e.g., weights, biases, or other parameters) based on the assessment of its prediction (e.g., outputs 406) and reference feedback information (e.g., user indication of accuracy, reference labels, or other information). In another embodiment, where server 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the server 402 may be trained to generate better predictions.

In some embodiments, server 402 may include an artificial neural network. In such embodiments, server 402 may include an input layer and one or more hidden layers. Each neural unit of server 402 may be connected with many other neural units of server 402. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Server 402 may be self-learning and trained, rather than explicitly programmed, and can perform significantly better in certain areas of problem solving, as compared to traditional computer programs. During training, an output layer of server 402 may correspond to a classification of server 402 and an input known to correspond to that classification may be input into an input layer of server 402 during training. During testing, an input without a known classification may be input into the input layer and a determined classification may be output.

In some embodiments, server 402 may include multiple layers (e.g., where a signal path traverses from front layers to back layers). In some embodiments, back propagation techniques may be utilized by server 402 where forward stimulation is used to reset weights on the "front" neural units. In some embodiments, stimulation and inhibition for a machine learning model implemented on server 402 may be more free flowing, with connections interacting in a more chaotic and complex fashion. During testing, an output layer of server 402 may indicate whether or not a given input corresponds to a classification of server 402. Server 402 may be used for populating application-specific information using overlay applications or for determining whether or not an application corresponds to a current version of an application.

Figure 5:
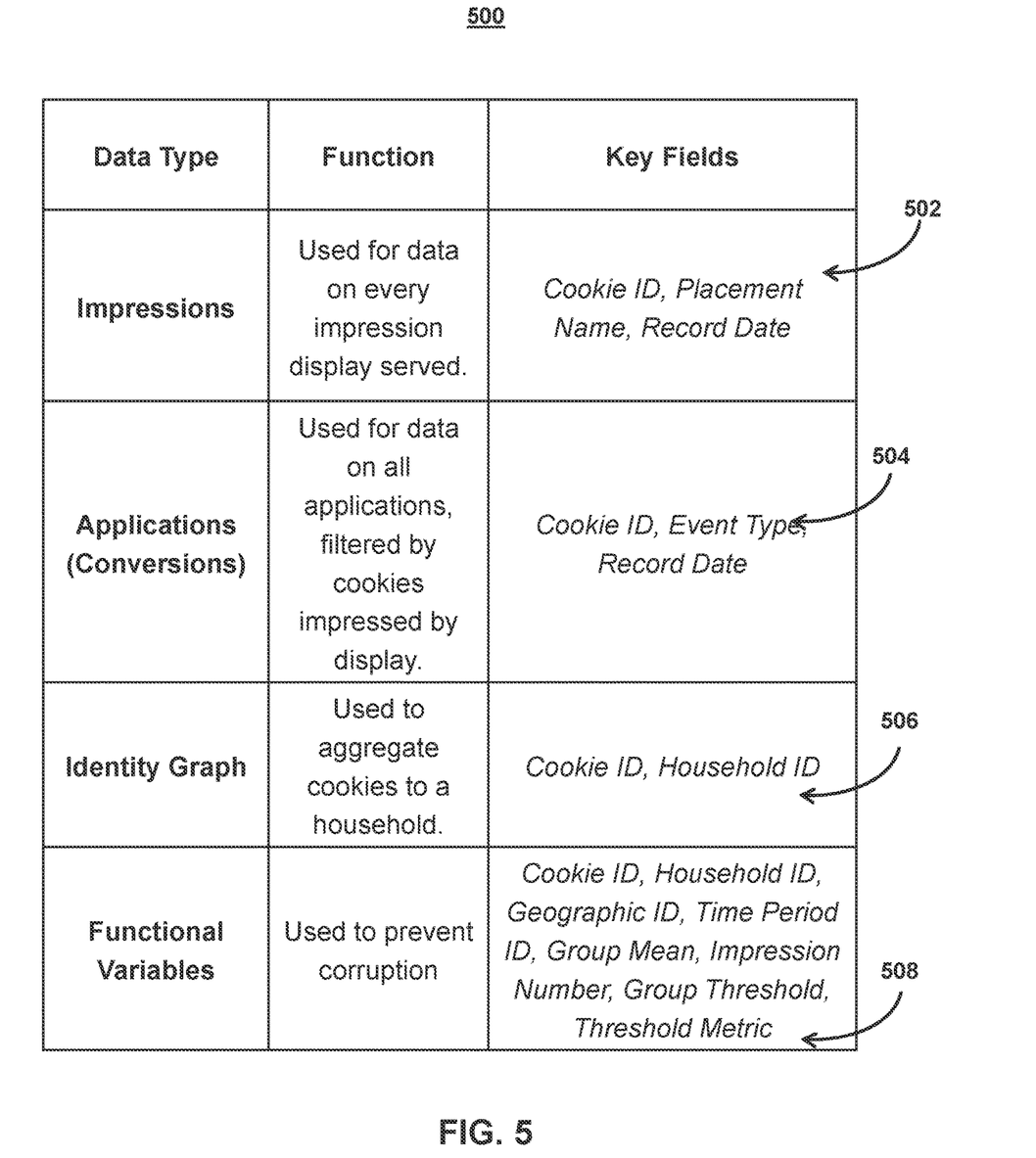
FIG. 5 shows an illustrative pseudo-data structure for preventing corruption in stateful data used for determining incrementality of impressions corresponding to the stateful data, in accordance with one or more embodiments.

FIG. 5 shows an illustrative pseudo-data structure for preventing corruption in stateful data used for determining incrementality of impressions corresponding to the stateful data, in accordance with one or more embodiments. For example, the methods and systems described herein recite the use of specific data structures for stateful data that include fields for populating with specific information that may be used to prevent and/or minimize the corruption. Data structure 500 is shown in FIG. 5.

For example, data structure 500 may comprise a pseudo-data structure. Data structure 500 includes potential data fields that may contain information used to prevent corruption. For example, data structure 500 may include fields related to a given impression. These fields may provide a function of describing the impression (or content of the impression). For example, field 502 may include an identifier of the stateful data (e.g., cookie ID), a name where the impression was placed (e.g., a placement name), and/or a date that the impression was served (e.g., a record date).

Data structure 500 may also include fields related to applications associated with the impression and/or whether or not a conversion took place. The fields may provide data related to the use and/or application of the impression. For example, field 504 may include an identifier of the stateful data (e.g., cookie ID), a name of an event or type of event related to the impression (e.g., event type), which may include whether or not the impression was converted, and/or a date that the impression was converted (e.g., a record date).

Data structure 500 may also include fields used to aggregate stateful data at a household related to applications associated with the impression and/or whether or not a conversion took place. The fields may provide data related to the use and/or application of the impression. For example, field 506 may include an identifier of the stateful data (e.g., cookie ID) and/or an identifier of a household (e.g., household ID).

Data structure 500 may also include fields used to apply functions to prevent corruptions. For example, field 508 may include various variables used to filter and/or sort impression metrics in order to remove corruption. For example, field 508 may include an identifier of the stateful data (e.g., cookie ID), an identifier of a household (e.g., household ID), an identifier of a geographic area (e.g., geographic ID), an identifier of a time period (e.g., time period ID), an identifier of a group mean (e.g., Group Mean), a total impression number for a household (e.g., Impression Number), a threshold for a group (e.g., Group Threshold), and a threshold from given impression metrics (e.g., Threshold Metric).

Figure 6:
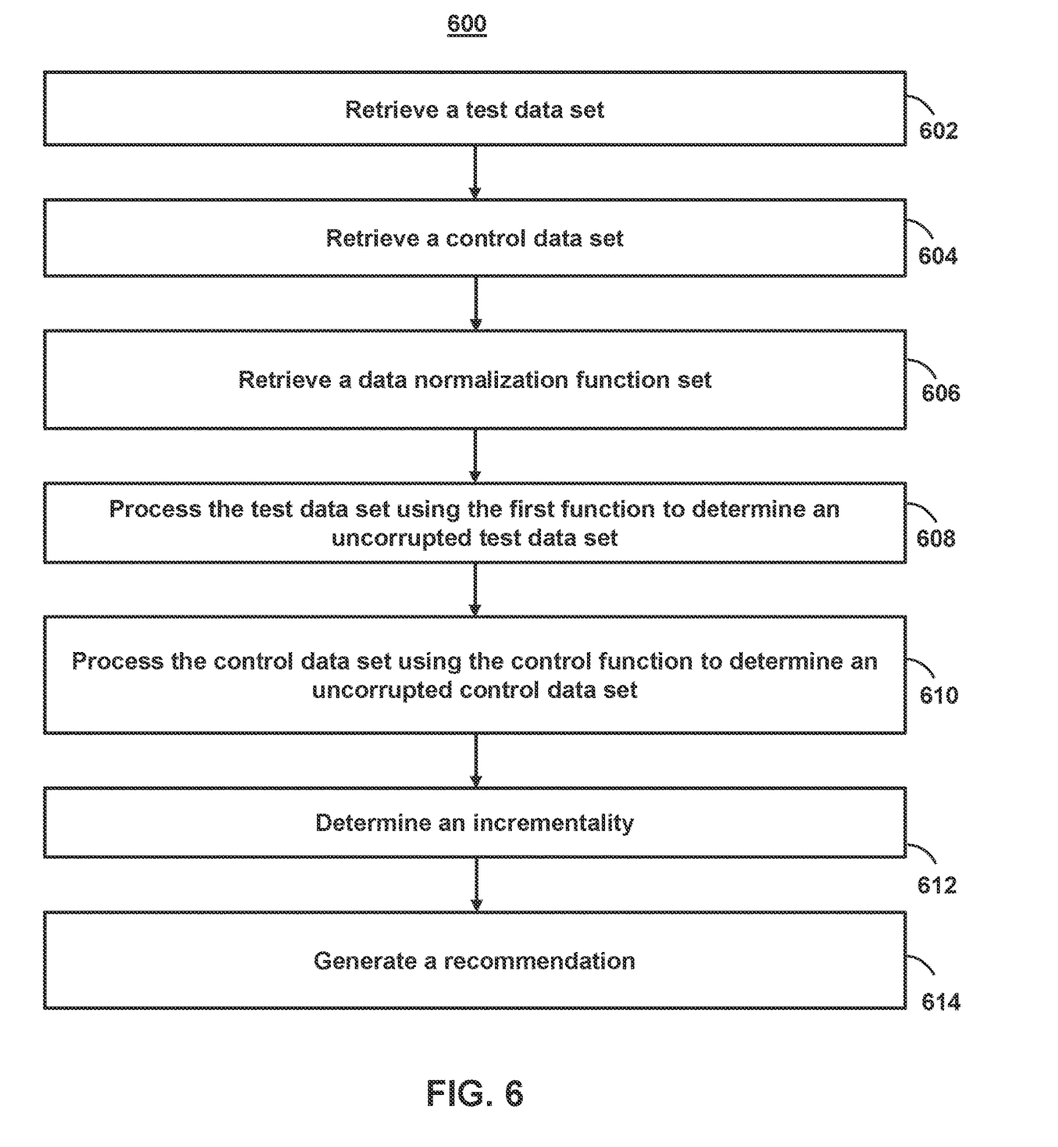
FIG. 6 shows flowchart of the steps involved in determining whether or not an application corresponds to a current version of an application, in accordance with one or more embodiments.

FIG. 6 shows a flowchart of the steps involved in determining whether or not an application corresponds to a current version of an application, in accordance with one or more embodiments. For example, process 600 may comprise steps taken to generate a recommendation related to incrementality of uncorrupted conversion rate data.

At step 602, process 600 retrieves (e.g., via one or more components of FIG. 4) a test data set. For example, the system may retrieve, using control circuitry, a test data set, wherein the test data set comprises respective stateful data for test content, and wherein the respective stateful data indicates impressions made corresponding to the test content. For example, in some embodiments, the stateful data may comprise any information that a computer or program uses to keep track of a state of interaction, usually by setting values in a storage field designated for that purpose. For example, in some embodiments, the respective stateful data for the test content may be an HTTP cookie for the test content, and wherein the respective stateful data for the control content may be an HTTP cookie for the control content.

At step 604, process 600 retrieves (e.g., via one or more components of FIG. 4) a control data set. For example, the system may retrieve, using the control circuitry, a control data set, wherein the control data set comprises respective stateful data for control content, and wherein the respective stateful data indicates impressions made corresponding to the control content.

In some embodiments, the system may retrieve a full data set. For example, the system may store a large database of data. The system may pull from this database to extract the test data set. The system may divide the full data set into a first data set and a second data set, wherein the first data set comprises ninety percent of the full data set, and wherein the second data set comprises ten percent of the full data set. For example, the system may split available data into 90 percent and 10 percent. The system may then further divide the test data set in order to prevent introducing bias into the system. For example, the test and control data sets may require a prerequisite of impressions. However, each record in the data set (e.g., corresponding to a household) may not meet this prerequisite. Therefore, to ensure that similar amounts of records from each data set are filtered out and/or no bias is introduced, the system may further divide the test and control data sets such that the test and control data sets have a similar size. Therefore, the system may assign the second data set as the control data set. The system may then determine a portion of the first data set corresponding to a size of the second data set. The system may then assign the portion of the first data set as the test data set.

At step 606, process 600 retrieves (e.g., via one or more components of FIG. 4) a data normalization function set. For example, the system may retrieve, using the control circuitry, a data normalization function set, wherein the data normalization function set comprises a first function for removing corruption from the first data set and a second function for removing corruption from the second data set. In some embodiments, the system may prevent corruption by pulling test and control data sets from different geographic areas. For example, by having test and control data sets from different geographic areas, the system minimizes the likelihood of the test and control data sets being corrupted (e.g., minimize the likelihood that a user has seen both a test and control content).

For example, the system may retrieve a full data set. The system may then filter the full data set based on geographic area. The system may then determine the test data set based on the test data set corresponding to a first geographic area (e.g., a first state, country, etc.). The system may then determine the control data set based on the control data set corresponding to a second geographic area (e.g., a second state, country, etc.).

In some embodiments, the system may prevent corruption by pulling test and control data sets from different time periods. For example, by limiting test and control data sets from different time periods, the system minimizes the likelihood of the test and control data sets being corrupted (e.g., minimize the likelihood that a user has seen both a test and control content). For example, the system may select control data in which control content was displayed prior to any test content. For example, the system may retrieve a full data set. The system may then filter the full data set based on a time period. The system may determine the test data set based on the test data set corresponding to a first time period. The system may then determine the control data set based on the control data set corresponding to a second time period.

Alternatively, the system may select data from the same time period (e.g., a recent time period) in order to prevent the data from being corrupted. For example, the longer both test and control content is being used for impressions, the higher the likelihood that the data may become corrupted. Therefore, the system may filter data from a single time period (e.g., a recent month, etc.) and exclude older data.

Alternatively, the system may select data with the same frequency in order to prevent the data from being corrupted. For example, the longer both test and control content goes without being viewed during an impression, the higher the likelihood that the data may become corrupted. Therefore, the system may filter data based on frequencies.

In some embodiments, the system may prevent corruption by pulling test and control data sets by filtering data sets based on household. For example, by limiting test and control data sets to a single household, the system minimizes the likelihood of the test and control data sets being corrupted (e.g., minimize the likelihood that a user has seen both a test and control content) through viewing test and control content on different devices. For example, the system may pull zip codes, geo-tracking information, IP addresses of devices, and/or location data to confirm that multiple devices belong in a single household. For example, the system may retrieve a full data set. The system may filter the full data set based on whether data from the full data set is attributable to a household. The system may extract the test data set from the filtered full data set. The system may then extract the control data set from the filtered full data set.

At step 608, process 600 processes (e.g., via one or more components of FIG. 4) the test data set using the first function to determine an uncorrupted test data set. For example, the system may process, using the control circuitry, the test data set using the first function to determine an uncorrupted test data set, wherein the uncorrupted test data set comprises uncorrupted respective stateful data for the test content, and wherein the uncorrupted respective stateful data indicates uncorrupted impressions made corresponding to the test content.

At step 610, process 600 processes (e.g., via one or more components of FIG. 4) the control data set using the control function to determine an uncorrupted control data set. For example, the system may process, using the control circuitry, the control data set using the control function to determine an uncorrupted control data set, wherein the uncorrupted control data set comprises uncorrupted respective stateful data for the control content, and wherein the uncorrupted respective stateful data indicates uncorrupted impressions made corresponding to the control content.

Alternatively or additionally, the system may retrieve data normalization function sets to ensure that test and control data sets are not corrupted. For example, the system may only use data in which the impression metrics used are over two standard deviations from a mean of the respective impression metrics. For example, the data normalization function set may include a first function that comprises: determining respective impression metrics for the test data set; and filtering out data from the test data set that has a respective impression metric over two standard deviations from a mean of the respective impression metrics for the test data set. The data normalization function set may also include a second function that comprises: determining respective impression metrics for the control data set; and filtering out data from the control data set that has a respective impression metric over two standard deviations from a mean of the respective impression metrics for the control data set.

Alternatively or additionally, the system may retrieve data normalization function sets to ensure that test and control data sets are not corrupted. For example, the system may determine a mean of the respective impression metrics. For example, the data normalization function set may include a first function that comprises: determining respective impression metrics for the test data set; and determining a mean of the respective impression metrics for the test data set. The data normalization function set may also include a second function that comprises: determining respective impression metrics for the control data set; and determining a mean of the respective impression metrics for the control data set.

Alternatively or additionally, the system may retrieve data normalization function sets to ensure that test and control data sets are not corrupted. For example, the system may use a regression analysis based on variables such as frequency and/or a total number of impressions from a given household. For example, the data normalization function set may include a first function that comprises a first regression analysis, wherein variables for the first regression analysis include a frequency at which the respective stateful data for the test content originated from a given household and a number of the respective stateful data for the test content that originated from the given household. For example, the data normalization function set may include a second function that comprise a second regression analysis, wherein variables for the second regression analysis include a frequency at which the respective stateful data for the control content originated from a given household and a number of the respective stateful data for the control content that originated from the given household.

Alternatively or additionally, the system may retrieve data normalization function sets to ensure that test and control data sets are not corrupted. For example, the system may determine a frequency or a total number of impressions originating from a single household. For example, the data normalization function set may include a first function that comprises filtering the respective stateful data for the test content based on a frequency at which the respective stateful data for the test content originated from a given household or a number of the respective stateful data for the test content that originated from the given household. For example, the data normalization function set may include a second function that comprises filtering the respective stateful data for the control content based on a frequency at which the respective stateful data for the control content originated from a given household or a number of the respective stateful data for the control content that originated from the given household.

At step 612, process 600 determines (e.g., via one or more components of FIG. 4) an incrementality. For example, the system may determine, using the control circuitry, an incrementality based on the uncorrupted impressions made corresponding to the test content and uncorrupted impressions made corresponding to the control content. In some embodiments, the incrementality may be expressed as an incrementality factor or number. The incrementality may also be expressed as a percentage or ratio. For example, the system may determine an incrementality based on the uncorrupted impressions made corresponding to the test content and uncorrupted impressions made corresponding to the control content comprising: determining a first conversion rate of the uncorrupted impressions made corresponding to the test content; determining a second conversion rate of the uncorrupted impressions made corresponding to the control content; and determining the incrementality based on the first conversion rate and the second conversion rate.

At step 614, process 600 generates (e.g., via one or more components of FIG. 4) a recommendation. For example, the system may generate for display, on a user interface, a recommendation based on the incrementality. For example, the system may generate a recommendation that includes and/or indicates information related to the incrementality.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for preventing corruption in stateful data used for determining incrementality of impressions corresponding to the stateful data, the method comprising: retrieving a test data set, wherein the test data set comprises respective stateful data for test content, and wherein the respective stateful data indicates impressions made corresponding to the test content; and retrieving a control data set, wherein the control data set comprises respective stateful data for control content, and wherein the respective stateful data indicates impressions made corresponding to the control content; retrieving a data normalization function set, wherein the data normalization function set comprises a first function for removing corruption from the test data set and a second function for removing corruption from the control data set.

2. The method of any one of the preceding embodiments, further comprising: processing the test data set using the first function to determine an uncorrupted test data set, wherein the uncorrupted test data set comprises uncorrupted respective stateful data for the test content, and wherein the uncorrupted respective stateful data indicates uncorrupted impressions made corresponding to the test content; processing the control data set using the control function to determine an uncorrupted control data set, wherein the uncorrupted control data set comprises uncorrupted respective stateful data for the control content, and wherein the uncorrupted respective stateful data indicates uncorrupted impressions made corresponding to the control content; determining an incrementality based on the uncorrupted impressions made corresponding to the test content and uncorrupted impressions made corresponding to the control content; and generating for display a recommendation based on the incrementality.

3. The method of any one of the preceding embodiments, wherein the respective stateful data for the test content is an HTTP cookie for the test content, and wherein the respective stateful data for the control content is an HTTP cookie for the control content.

4. The method of any one of the preceding embodiments, further comprising: retrieving a full data set; dividing the full data set into a first data set and a second data set, wherein the first data set comprises ninety percent of the full data set, and wherein the second data set comprises ten percent of the full data set; assigning the second data set as the control data set; determining a portion of the first data set corresponding to a size of the second data set; and assigning the portion of the first data set as the test data set.

5. The method of any one of the preceding embodiments, further comprising: retrieving a full data set; filtering the full data set based on geographic area; determining the test data set based on the test data set corresponding to a first geographic area; and determining the control data set based on the control data set corresponding to a second geographic area.

6. The method of any one of the preceding embodiments, further comprising: retrieving a full data set; filtering the full data set based on time period; determining the test data set based on the test data set corresponding to a first time period; and determining the control data set based on the control data set corresponding to a second time period.

7. The method of any one of the preceding embodiments, further comprising: retrieving a full data set; filtering the full data set based on whether data from the full data set is attributable to a household; extracting the test data set from the filtered full data set; and extracting the control data set from the filtered full data set.

8. The method of any one of the preceding embodiments, wherein the first function comprises: determining respective impression metrics for the test data set; and filtering out data from the test data set that has a respective impression metric over two standard deviations from a mean of the respective impression metrics for the test data set; and the second function comprises: determining respective impression metrics for the control data set; and filtering out data from the control data set that has a respective impression metric over two standard deviations from a mean of the respective impression metrics for the control data set.

9. The method of any one of the preceding embodiments, wherein the first function comprises: determining respective impression metrics for the test data set; and determining a mean of the respective impression metrics for the test data set; and the second function comprises: determining respective impression metrics for the control data set; and determining a mean of the respective impression metrics for the control data set.

10. The method of any one of the preceding embodiments, wherein: the first function comprises a first regression analysis, wherein variables for the first regression analysis include a frequency at which the respective stateful data for the test content originated from a given household and a number of the respective stateful data for the test content that originated from the given household; and the second function comprises a second regression analysis, wherein variables for the second regression analysis include a frequency at which the respective stateful data for the control content originated from a given household and a number of the respective stateful data for the control content that originated from the given household.

11. The method of any one of the preceding embodiments, wherein: the first function filtering the respective stateful data for the test content based on a frequency at which the respective stateful data for the test content originated from a given household or a number of the respective stateful data for the test content that originated from the given household; and the second function filtering the respective stateful data for the control content based on a frequency at which the respective stateful data for the control content originated from a given household or a number of the respective stateful data for the control content that originated from the given household.

12. The method of any one of the preceding embodiments, wherein determining an incrementality based on the uncorrupted impressions made corresponding to the test content and uncorrupted impressions made corresponding to the control content comprises: determining a first conversion rate of the uncorrupted impressions made corresponding to the test content; determining a second conversion rate of the uncorrupted impressions made corresponding to the control content; and determining the incrementality based on the first conversion rate and the second conversion rate.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing any of embodiments 1-12.

What is claimed is:

1. A system for preventing corruption in stateful data used for determining incrementality of impressions corresponding to the stateful data, the system comprising:
cloud-based storage circuitry configured to:
receive a full data set;
filter the full data set based on a geographic area, comprising operations to:
filter the full data set to extract a test data set, wherein the test data set comprises respective stateful data for test content corresponding to a first geographic area, and wherein the respective stateful data indicates impressions made corresponding to the test content; and
filter the full data set to extract a control data set, wherein the control data set comprises respective stateful data for control content corresponding to a second geographic area, and wherein the respective stateful data indicates impressions made corresponding to the control content, and wherein the test data set and the control data set are mutually exclusive;
cloud-based control circuitry configured to:
retrieve the test data set;
retrieve the control data set;
retrieve a data normalization function set, wherein the data normalization function set comprises a first function for applying to the test data set and a second function for applying to the control data set;
process the test data set using the first function to determine an uncorrupted test data set by filtering the respective stateful data for the test content based on a frequency at which the respective stateful data for the test content originated from a given household, wherein the uncorrupted test data set comprises uncorrupted respective stateful data for the test content, and wherein the uncorrupted respective stateful data indicates uncorrupted impressions made corresponding to the test content;
process the control data set using the control function to determine an uncorrupted control data set by filtering the respective stateful data for the control content based on a frequency at which the respective stateful data for the control content originated from a given household, wherein the uncorrupted control data set comprises uncorrupted respective stateful data for the control content, and wherein the uncorrupted respective stateful data indicates uncorrupted impressions made corresponding to the control content;
determine an incrementality across values in the full data set based on the uncorrupted impressions made corresponding to the test content and uncorrupted impressions made corresponding to the control content by:
determining a first conversion rate of the uncorrupted impressions made corresponding to the test content;
determining a second conversion rate of the uncorrupted impressions made corresponding to the control content; and
determining the incrementality based on the first conversion rate and the second conversion rate; and
generate for display, on a user interface, a recommendation based on the incrementality.

2. A method for preventing corruption in stateful data used for determining incrementality of impressions corresponding to the stateful data, the method comprising:
filtering, using control circuitry, a full data set to extract a test data set, wherein the test data set comprises respective stateful data for test content corresponding to a first geographic area, and wherein the respective stateful data indicates impressions made corresponding to the test content;
filtering, using the control circuitry, the full data set to extract a control data set, wherein the control data set comprises respective stateful data for control content corresponding to a second geographic area, and wherein the respective stateful data indicates impressions made corresponding to the control content, and wherein the test data set and the control data set are mutually exclusive;

retrieving, using the control circuitry, a data normalization function set, wherein the data normalization function set comprises a first function for removing corruption from the test data set by and a second function for removing corruption from the control data set;

processing, using the control circuitry, the test data set using the first function to determine an uncorrupted test data set by filtering the respective stateful data for the test content based on a frequency at which the respective stateful data for the test content originated from a given household, wherein the uncorrupted test data set comprises uncorrupted respective stateful data for the test content, and wherein the uncorrupted respective stateful data indicates uncorrupted impressions made corresponding to the test content;

processing, using the control circuitry, the control data set using the control function to determine an uncorrupted control data set by filtering the respective stateful data for the control content based on a frequency at which the respective stateful data for the control content originated from a given household, wherein the uncorrupted control data set comprises uncorrupted respective stateful data for the control content, and wherein the uncorrupted respective stateful data indicates uncorrupted impressions made corresponding to the control content;

determining, using the control circuitry, an incrementality across values in the full data set based on the uncorrupted impressions made corresponding to the test content and uncorrupted impressions made corresponding to the control content; and generating for display, on a user interface, a recommendation based on the incrementality.

3. The method of claim 2, wherein the respective stateful data for the test content is an HTTP cookie for the test content, and wherein the respective stateful data for the control content is an HTTP cookie for the control content.

4. The method of claim 2, further comprising:
retrieving the full data set;
dividing the full data set into a first data set and a second data set, wherein the first data set comprises ninety percent of the full data set, and wherein the second data set comprises ten percent of the full data set;
assigning the second data set as the control data set;
determining a portion of the first data set corresponding to a size of the second data set; and
assigning the portion of the first data set as the test data set.

5. The method of claim 2, further comprising:
retrieving the full data set; and
filtering the full data set based on whether data from the full data set is attributable to a household.

6. The method of claim 2, wherein:
the first function further comprises:
determining respective impression metrics for the test data set; and
filtering out data from the test data set that has a respective impression metric over two standard deviations from a mean of the respective impression metrics for the test data set; and
the second function further comprises:
determining respective impression metrics for the control data set; and
filtering out data from the control data set that has a respective impression metric over two standard deviations from a mean of the respective impression metrics for the control data set.

7. The method of claim 2, wherein:
the first function further comprises:
determining respective impression metrics for the test data set; and
determining a mean of the respective impression metrics for the test data set; and
the second function further comprises:
determining respective impression metrics for the control data set; and
determining a mean of the respective impression metrics for the control data set.

8. The method of claim 2, wherein:
the first function further comprises a first regression analysis, wherein variables for the first regression analysis include a frequency at which the respective stateful data for the test content originated from a given household and a number of the respective stateful data for the test content that originated from the given household; and
the second function further comprises a second regression analysis, wherein variables for the second regression analysis include a frequency at which the respective stateful data for the control content originated from a given household and a number of the respective stateful data for the control content that originated from the given household.

9. The method of claim 2, wherein determining an incrementality based on the uncorrupted impressions made corresponding to the test content and uncorrupted impressions made corresponding to the control content comprises:
determining a first conversion rate of the uncorrupted impressions made corresponding to the test content;
determining a second conversion rate of the uncorrupted impressions made corresponding to the control content; and
determining the incrementality based on the first conversion rate and the second conversion rate.

10. A non-transitory computer-readable medium for preventing corruption in stateful data used for determining incrementality of impressions corresponding to the stateful data comprising instructions that, when executed by one or more processors, cause operations comprising:
filtering a full data set to extract a test data set corresponding to a first geographic area, wherein the test data set comprises respective stateful data for test content, and wherein the respective stateful data indicates impressions made corresponding to the test content;
filtering the full data set to extract a control data set corresponding to a second geographic area, wherein the control data set comprises respective stateful data for control content, and wherein the respective stateful data indicates impressions made corresponding to the control content, and wherein the test data set and the control data set are mutually exclusive;
retrieving a data normalization function set, wherein the data normalization function set comprises a first function for removing corruption from the test data set and a second function for removing corruption from the control data set;
processing the test data set using the first function to determine an uncorrupted test data set by filtering the respective stateful data for the test content based on a frequency at which the respective stateful data for the test content originated from a given household, wherein the uncorrupted test data set comprises uncorrupted respective stateful data for the test content, and wherein the uncorrupted respective stateful data indicates uncorrupted impressions made corresponding to the test content;

processing the control data set using the control function to determine an uncorrupted control data set by filtering the respective stateful data for the control content based on a frequency at which the respective stateful data for the control content originated from a given household or, wherein the uncorrupted control data set comprises uncorrupted respective stateful data for the control content, and wherein the uncorrupted respective stateful data indicates uncorrupted impressions made corresponding to the control content;

determining an incrementality across values in the full data set based on the uncorrupted impressions made corresponding to the test content and uncorrupted impressions made corresponding to the control content; and generating for display, on a user interface, a recommendation based on the incrementality.

11. The non-transitory computer readable medium of claim 10, wherein the respective stateful data for the test content is an HTTP cookie for the test content, and wherein the respective stateful data for the control content is an HTTP cookie for the control content.

12. The non-transitory computer readable medium of claim 10, further comprising:
    retrieving the full data set;
    dividing the full data set into a first data set and a second data set, wherein the first data set comprises ninety percent of the full data set, and wherein the second data set comprises ten percent of the full data set;
    assigning the second data set as the control data set;
    determining a portion of the first data set corresponding to a size of the second data set; and
    assigning the portion of the first data set as the test data set.

13. The non-transitory computer readable medium of claim 10, further comprising:
    retrieving the full data set; and
    filtering the full data set based on whether data from the full data set is attributable to a household.

14. The non-transitory computer readable medium of claim 10, wherein:
    the first function further comprises:
        determining respective impression metrics for the test data set; and
        filtering out data from the test data set that has a respective impression metric over two standard deviations from a mean of the respective impression metrics for the test data set; and
    the second function further comprises:
        determining respective impression metrics for the control data set; and
        filtering out data from the control data set that has a respective impression metric over two standard deviations from a mean of the respective impression metrics for the control data set.

15. The non-transitory computer readable medium of claim 10, wherein:
    the first function further comprises:
        determining respective impression metrics for the test data set; and
        determining a mean of the respective impression metrics for the test data set; and
    the second function further comprises:
        determining respective impression metrics for the control data set; and
        determining a mean of the respective impression metrics for the control data set.

16. The non-transitory computer readable medium of claim 10, wherein:
    the first function further comprises a first regression analysis, wherein variables for the first regression analysis include a frequency at which the respective stateful data for the test content originated from a given household and a number of the respective stateful data for the test content that originated from the given household; and
    the second function further comprises a second regression analysis, wherein variables for the second regression analysis include a frequency at which the respective stateful data for the control content originated from a given household and a number of the respective stateful data for the control content that originated from the given household.

17. The non-transitory computer-readable medium of claim 10, wherein the respective stateful data in the full data set comprises an HTTP cookie comprising an aggregation value, and wherein extracting the test data set and the control data set is based on the aggregation value.

18. The non-transitory computer-readable medium of claim 10, wherein extracting the test data set and the control data set is based on an item included in an HTTP cookie.

* * * * *